United States Patent
Wuolijoki (10) Patent No.: US 10,853,993 B2
(45) Date of Patent: Dec. 1, 2020

(54) SYSTEM AND METHOD FOR PRODUCING IMAGES FOR DISPLAY APPARATUS

(71) Applicant: Varjo Technologies Oy, Helsinki (FI)

(72) Inventor: Jarno Wuolijoki, Helsinki (FI)

(73) Assignee: Varjo Technologies Oy, Helsinki (FI)

(*) Notice: Subject to any disclaimer, the term of this patent is extended or adjusted under 35 U.S.C. 154(b) by 0 days.

(21) Appl. No.: 16/505,982

(22) Filed: Jul. 9, 2019

(65) Prior Publication Data

US 2020/0193692 A1 Jun. 18, 2020

Related U.S. Application Data

(63) Continuation-in-part of application No. 16/223,657, filed on Dec. 18, 2018, now Pat. No. 10,791,323.

(51) Int. Cl.

| | |
|---|---|
| *G06T 7/136* | (2017.01) |
| *G06T 7/174* | (2017.01) |
| *G06T 7/11* | (2017.01) |
| *G02B 27/01* | (2006.01) |
| *G02B 27/00* | (2006.01) |
| *G06T 15/20* | (2011.01) |
| *G06F 3/01* | (2006.01) |

(52) U.S. Cl.
CPC ........ *G06T 15/205* (2013.01); *G02B 27/0093* (2013.01); *G02B 27/0172* (2013.01);
(Continued)

(58) Field of Classification Search
CPC ............ G02B 27/0093; G02B 27/0172; G02B 2027/014; G06T 15/205; G06T 7/174;
(Continued)

(56) References Cited

U.S. PATENT DOCUMENTS

| | | | |
|---|---|---|---|
| 9,779,478 B1 | 10/2017 | Wilson et al. | |
| 2015/0288933 A1* | 10/2015 | Iversen | G06F 1/163 |
| | | | 348/14.07 |

(Continued)

FOREIGN PATENT DOCUMENTS

| | | |
|---|---|---|
| WO | 2000062543 A1 | 10/2000 |
| WO | 2018100238 A2 | 6/2018 |
| WO | WO-2018100238 A2 * | 6/2018 ........... H04N 13/296 |

OTHER PUBLICATIONS

Notification of Transmittal of the International Search Report and the Written Opinion of the International Searching Authority, or the Declaration issued in International Patent Application No. PCT/FI2019/050848 dated Jan. 30, 2020, 14 pages.

(Continued)

*Primary Examiner* — Lin Ye
*Assistant Examiner* — John H Morehead, III
(74) *Attorney, Agent, or Firm* — Ziegler IP Law Group, LLC (57) ABSTRACT

A system for producing images for display apparatus includes an image source to obtain an input image and a processor configured to obtain information of a gaze direction of a user, determine a region of interest of the input image based on the gaze direction, and process the input image to generate a first with a first region that is blurred with respect to region of interest, and a second image corresponding to the region of interest. The processor adjusts an intensity of pixels within the first region and an intensity of pixels within the second image. When an intensity of a given pixel within the region of interest is lower than or equal to a predefined intensity threshold, an intensity of a corresponding pixel within the first region is lower than an intensity of a corresponding pixel within the second image.

16 Claims, 3 Drawing Sheets

(52) U.S. Cl.
CPC .............. *G06F 3/012* (2013.01); *G06F 3/013* (2013.01); *G06T 7/11* (2017.01); *G06T 7/136* (2017.01); *G06T 7/174* (2017.01); *G02B 2027/014* (2013.01)

(58) Field of Classification Search
CPC . G06T 7/136; G06T 7/11; G06F 3/013; G06F 3/012
See application file for complete search history.

(56) References Cited

U.S. PATENT DOCUMENTS

| | | | | |
|---|---|---|---|---|
| 2016/0240013 | A1* | 8/2016 | Spitzer | G02B 27/0179 |
| 2016/0328879 | A1* | 11/2016 | Jin | G06T 1/60 |
| 2017/0038590 | A1* | 2/2017 | Jepsen | G09G 3/3426 |
| 2017/0123209 | A1* | 5/2017 | Spitzer | G02B 27/0172 |
| 2017/0263046 | A1* | 9/2017 | Patney | G06F 3/013 |
| 2017/0365101 | A1* | 12/2017 | Samec | G06T 19/006 |
| 2018/0160100 | A1* | 6/2018 | Konttori | G06F 3/013 |
| 2018/0241982 | A1* | 8/2018 | Sun | H04N 13/15 |
| 2018/0308266 | A1 | 10/2018 | Surti et al. | |
| 2018/0367769 | A1* | 12/2018 | Greenberg | H04N 9/3129 |
| 2019/0318530 | A1* | 10/2019 | Hunt | G06T 15/06 |

OTHER PUBLICATIONS

Notification of Transmittal of the International Search Report and the Written Opinion of the International Searching Authority, or the Declaration issued in International Patent Application No. PCT/FI2019/050847 dated Jan. 30, 2020, 16 pages.

\* cited by examiner

SYSTEM AND METHOD FOR PRODUCING IMAGES FOR DISPLAY APPARATUS

CROSS-REFERENCE TO RELATED APPLICATIONS

This application is a continuation-in-part of U.S. patent application Ser. No. 16/223,657, titled "SYSTEM AND METHOD FOR PROCESSING IMAGES FOR DISPLAY APPARATUS" and filed on Dec. 18, 2018, which is incorporated herein by reference.

TECHNICAL FIELD

The present disclosure relates generally to image processing; and more specifically, to systems for producing images for display apparatuses. Moreover, the present disclosure relates to methods of producing images for display apparatuses. Furthermore, the present disclosure also relates to computer program products comprising non-transitory machine-readable data storage media having stored thereon program instructions that, when accessed by processing devices, cause the processing devices to execute the aforementioned methods.

BACKGROUND

Presently, several technologies (for example, such as virtual reality (VR), augmented reality (AR), mixed reality (MR) and extended reality (XR)) are being used to present interactive simulated environments to users. The users utilize specialized Head-Mounted Devices (HMDs) for experiencing and interacting with such simulated environments. Nowadays, the HMDs are also being designed to imitate a physiology of human vision by displaying foveated images to the user.

Conventional HMDs generally utilise multiple images for collectively forming a given scene of such simulated environments. These multiple images are required to be optically combined with each other in a suitable manner that the users view a unified, immersive scene.

However, generating such images for the HMDs is associated with certain problems. Firstly, due to limited advancement of conventional image processing techniques, when multiple low-intensity images are optically combined to produce a low-intensity (namely, low-brightness) scene, said scene appears non-uniform to the user. Secondly, suitably adjusting intensities of the multiple low-intensity images when multiple image renderers are used to render said multiple low-intensity images is extremely challenging due to difference in scotopic vision and photopic vision of humans. The different image renderers generally have different ranges of colour reproduction. When the aforesaid adjustment of intensities is improper, a perceptual colour difference between the multiple low-intensity images becomes very prominent upon combining said images to form the low-intensity scene. As a result, the user is provided with a sub-optimal immersive experience of the low-intensity scene.

Therefore, in light of the foregoing discussion, there exists a need to overcome the aforementioned drawbacks associated with generating images for display apparatuses.

SUMMARY

The present disclosure seeks to provide a system for producing images for a display apparatus. The present disclosure also seeks to provide a method of producing images for a display apparatus. The present disclosure also seeks to provide a computer program product comprising a non-transitory machine-readable data storage medium having stored thereon program instructions that, when accessed by a processing device, cause the processing device to execute a method of producing images for a display apparatus. The present disclosure seeks to provide a solution to the existing problems of suboptimal image processing techniques for producing low-intensity images for a display apparatus. An aim of the present disclosure is to provide a solution that overcomes at least partially the problems encountered in prior art, and provides a specialized and efficient system for producing smoothly blendable low-intensity images for the display apparatus.

In one aspect, an embodiment of the present disclosure provides a system for producing images for a display apparatus, comprising:
- an image source that is employed to obtain an input image; and
- a processor communicably coupled to the image source, the processor being configured to:
  - obtain information indicative of a gaze direction of a user;
  - determine a region of interest of the input image based on the gaze direction of the user; and
  - process the input image to generate a first image and a second image, the first image comprising a first region that is blurred with respect to the region of interest of the input image, wherein the second image corresponds to the region of interest of the input image, wherein, when generating the first image and the second image, the processor is configured to adjust, based on an intensity of pixels within the region of interest, an intensity of corresponding pixels within the first region of the first image and an intensity of corresponding pixels within the second image, wherein when an intensity of a given pixel within the region of interest is lower than or equal to a predefined intensity threshold, an intensity of a corresponding pixel within the first region of the first image is lower than an intensity of a corresponding pixel within the second image.

In another aspect, an embodiment of the present disclosure provides a method of producing images for a display apparatus, comprising:
- obtaining information indicative of a gaze direction of a user;
- determining a region of interest of an input image based on the gaze direction of the user; and
- processing the input image to generate a first image and a second image, the first image comprising a first region that is blurred with respect to the region of interest of the input image, wherein the second image corresponds to the region of interest of the input image, wherein the step of processing the input image comprises adjusting, based on an intensity of pixels within the region of interest, an intensity of corresponding pixels within the first region of the first image and an intensity of corresponding pixels within the second image, wherein when an intensity of a given pixel within the region of interest is lower than or equal to a predefined intensity threshold, an intensity of a corresponding pixel within the first region of the first image is lower than an intensity of a corresponding pixel within the second image.

In yet another aspect, an embodiment of the present disclosure provides a computer program product comprising a non-transitory machine-readable data storage medium having stored thereon program instructions that, when accessed by a processing device, cause the processing device to:

obtain information indicative of a gaze direction of a user;

determine a region of interest of an input image based on the gaze direction of the user; and     process the input image to generate a first image and a second image, the first image comprising a first region that is blurred with respect to the region of interest of the input image, wherein the second image corresponds to the region of interest of the input image, wherein the program instructions, when accessed by the processing device, cause the processing device to adjust, based on an intensity of pixels within the region of interest, an intensity of corresponding pixels within the first region of the first image and an intensity of corresponding pixels within the second image when processing the input image, wherein when an intensity of a given pixel within the region of interest is lower than or equal to a predefined intensity threshold, an intensity of a corresponding pixel within the first region of the first image is lower than an intensity of a corresponding pixel within the second image.

Embodiments of the present disclosure substantially eliminate or at least partially address the aforementioned problems in the prior art, and enable production of intensity-correct images for a display apparatus.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a system for producing images for a display apparatus, comprising:

an image source that is employed to obtain an input image; and     a processor communicably coupled to the image source, the processor being configured to:

obtain information indicative of a gaze direction of a user;

determine a region of interest of the input image based on the gaze direction of the user; and     process the input image to generate a first image and a second image, the first image comprising a first region that is blurred with respect to the region of interest of the input image, wherein the second image corresponds to the region of interest of the input image, wherein, when generating the first image and the second image, the processor is configured to adjust, based on an intensity of pixels within the region of interest, an intensity of corresponding pixels within the first region of the first image and an intensity of corresponding pixels within the second image, wherein when an intensity of a given pixel within the region of interest is lower than or equal to a predefined intensity threshold, an intensity of a corresponding pixel within the first region of the first image is lower than an intensity of a corresponding pixel within the second image.

In another aspect, an embodiment of the present disclosure provides a method of producing images for a display apparatus, comprising:

obtaining information indicative of a gaze direction of a user;

determining a region of interest of an input image based on the gaze direction of the user; and     processing the input image to generate a first image and a second image, the first image comprising a first region that is blurred with respect to the region of interest of the input image, wherein the second image corresponds to the region of interest of the input image, wherein the step of processing the input image comprises adjusting, based on an intensity of pixels within the region of interest, an intensity of corresponding pixels within the first region of the first image and an intensity of corresponding pixels within the second image, wherein when an intensity of a given pixel within the region of interest is lower than or equal to a predefined intensity threshold, an intensity of a corresponding pixel within the first region of the first image is lower than an intensity of a corresponding pixel within the second image.

In yet another aspect, an embodiment of the present disclosure provides a computer program product comprising a non-transitory machine-readable data storage medium having stored thereon program instructions that, when accessed by a processing device, cause the processing device to:

obtain information indicative of a gaze direction of a user;

determine a region of interest of an input image based on the gaze direction of the user; and process the input image to generate a first image and a second image, the first image comprising a first region that is blurred with respect to the region of interest of the input image, wherein the second image corresponds to the region of interest of the input image, wherein the program instructions, when accessed by the processing device, cause the processing device to adjust, based on an intensity of pixels within the region of interest, an intensity of corresponding pixels within the first region of the first image and an intensity of corresponding pixels within the second image when processing the input image, wherein when an intensity of a given pixel within the region of interest is lower than or equal to a predefined intensity threshold, an intensity of a corresponding pixel within the first region of the first image is lower than an intensity of a corresponding pixel within the second image.

The present disclosure provides the aforementioned system, method and computer program product. Beneficially, the first and second images produced via the system are generated in a manner that, upon optical combination, said images form a subtly-blended low-intensity visual scene. In particular, intensities of pixels within the first and second images is suitably adjusted to provide the aforesaid subtle (namely, smooth) blending effect. Such adjustment also accommodates for differences in colour reproduction properties of different image renderers that may be employed for rendering said first and second images. Moreover, the first and second images can be optically combined in respect of both scotopic vision and photopic vision of humans.

Throughout the present disclosure, the term "display apparatus" refers to specialized equipment that is configured to present a simulated environment to the user when the display apparatus in operation is worn by the user on his/her head. In such an instance, the display apparatus acts as a device (for example, such as a virtual reality headset, a pair of virtual reality glasses, an augmented reality headset, a pair of augmented reality glasses, a mixed reality headset, a pair of mixed reality glasses, and the like) that is operable to present a visual scene of the simulated environment to the user. The display apparatus may also commonly be referred to as "head-mounted display apparatus".

Optionally, the display apparatus comprises means for detecting a gaze direction of a user, said means being configured to produce information indicative of the gaze direction of the user.

Throughout the present disclosure, the term "means for detecting the gaze direction" refers to specialized equipment for detecting and/or following a direction of gaze of the user of the display apparatus, when said user views the visual scene via the display apparatus. Notably, the gaze direction of the user is detected when the display apparatus in operation is worn by the user. Optionally, the means for detecting the gaze direction is implemented by way of contact lenses with sensors, cameras monitoring the position of the pupil of the user's eye, and the like. Such means for detecting the gaze direction are well-known in the art. Beneficially, the means for detecting the gaze direction is arranged in a manner that said means does not cause any obstruction in an optical path of a projection of the visual scene.

The system produces images for the display apparatus. Such images collectively constitute the visual scene of the simulated environment. In other words, the visual scene comprises a sequence of images. In an example, the visual scene may be a virtual reality movie. In another example, the visual scene may be an educational augmented reality video. In yet another example, the visual scene may be a mixed reality game. It will be appreciated that the aforesaid system and the aforesaid method are not limited to producing only a single image for the display apparatus, and can be employed to produce the sequence of images constituting the visual scene. In such a case, image processing steps described herein are performed for a sequence of input images to produce the sequence of images for the display apparatus.

The system is at least communicably coupled to the display apparatus. By way of such communicable coupling, the system transmits the produced images to the display apparatus. In some implementations, the system is integrated with the display apparatus. In such implementations, the system is physically coupled to the display apparatus (for example, attached via mechanical and electrical connections to components of the display apparatus). In other implementations, the system is implemented on a remote device that is separate from the display apparatus. Optionally, the system is mounted on the remote device. Examples of the remote device include, but are not limited to, a drone and a robot. In such an instance, the remote device is physically positioned at a given real-world environment, whereas the user of the display apparatus is positioned away from (for example, at a distance from) the remote device. In such implementations, the system and the display apparatus are communicably coupled via a wired communication interface or a wireless communication interface.

Throughout the present disclosure, the term "image source" refers to equipment that, when employed, obtains the input image. Notably, the term "input image" refers to an image that is to be processed to produce the images for the display apparatus. It will be appreciated that the image source can be employed to obtain a single input image, as well as a plurality of input images.

Optionally, the image source comprises at least one camera that is employed to capture an image of a given real-world scene, wherein said image is to be utilized to obtain the input image. In such a case, the image of the given real-world scene could be directly utilized as the input image, or may be processed to obtain the input image.

Additionally or alternatively, optionally, the image source comprises a computer. In an embodiment, the input image is entirely generated by the computer. In another embodiment, the computer processes the image of the given real-world scene (captured by the at least one camera) for obtaining the input image. For example, the computer may add computer graphics to the image of the given real-world scene for obtaining the input image. In yet another embodiment, the computer is configured to retrieve the input image from a data repository. In still another embodiment, the computer processes an image retrieved from a data repository for obtaining the input image. Optionally, the data repository is implemented by way of a database arrangement, said database arrangement being coupled in communication with the computer. The term "database" generally refers to hardware, software, firmware, or a combination of these for storing information in an organized (namely, structured) manner, thereby, allowing for easy storage and retrieval (namely, access) of the input image. The term "database" also encompasses database servers that provide the aforesaid database services to the system.

Throughout the present disclosure, the phrase "obtaining the input image" has been used to mean any of the following:

capturing the image of the given real-world scene using the at least one camera, and using said image as the input image;

generating computer graphics using the computer, and using said computer graphics as the input image;

capturing the image of the given real-world scene using the at least one camera and adding computer graphics to the image of the given real-world scene using the computer for producing the input image;

retrieving, using the computer, the input image from the data repository; or retrieving the image from the data repository and adding computer graphics to the retrieved image using the computer for producing the input image.

Optionally, the processor is configured to control the image source to produce the input image based on the gaze direction of the user. In such a case, the processor utilizes the information indicative of the gaze direction of the user to control the image source in a manner that a portion of the visual scene towards which the user's gaze is directed is well-represented in the produced input image. When such a gaze-contingent input image is utilized to produce the images for the display apparatus, the user is provided with a feeling of immersion within the visual scene. By controlling the image source in the aforesaid manner, the processor adjusts the visual scene that is to be displayed to the user.

Optionally, when the image source comprises the at least one camera, the system further comprises at least one actuator for adjusting an orientation of the at least one camera, wherein the processor is configured to control the at least one actuator to adjust the orientation of the at least one camera based upon the detected gaze direction of the user. Notably, the orientation of the at least one camera is adjusted to produce the input image according to the gaze direction of the user. By adjusting the orientation of the at least one camera, a perspective and/or a field of view of the at least one camera is adjusted such that the image captured by the at least one camera depicts the portion of the visual scene towards which the user's gaze is directed.

Throughout the present disclosure, the term "actuator" refers to equipment (for example, such as electrical components, mechanical components, magnetic components, polymeric components, and so forth) that is employable to adjust an orientation of a given component. Furthermore, optionally, the at least one actuator is employed to tilt, rotate and/or translate the given component based upon the detected gaze direction of the user.

Optionally, the processor is configured to:

obtain information indicative of a head orientation of the user; and control the image source to produce the input image based on the head orientation of the user.

Optionally, in this regard, the display apparatus comprises means for tracking a head orientation of a user, said means being configured to produce the information indicative of the head orientation of the user. Throughout, the present disclosure, the term "means for tracking a head orientation" refers to specialized equipment for detecting and/or following an orientation of the user's head, when the display apparatus in operation is worn by the user.

Optionally, the processor controls the image source to produce the input image from a perspective of a current head orientation of the user. By controlling the image source in such a manner, the processor allows for producing perspective-correct input images. Such perspective-correct input images are employed to generate perspective-correct first and second images for the display apparatus. When the perspective-correct first and second images are displayed to the user via the display apparatus, the user feels a sense of immersion and realism within the visual scene. Examples of the means for tracking the head orientation of the user include, but are not limited to, a gyroscope, and an accelerometer.

Optionally, when the image source comprises the at least one camera, the system further comprises at least one actuator for adjusting an orientation of the at least one camera, wherein the processor is configured to control the at least one actuator to adjust the orientation of the at least one camera based upon the head orientation of the user. Notably, the at least one actuator adjusts the orientation of the at least one camera (for example, by way of rotating, tilting, and the like) to be similar to the head orientation of the user. As a result, the at least one camera is correctly oriented to capture the image of the given real-world scene from the same perspective as that of the user's head.

Throughout the present disclosure, the term "processor" refers to hardware, software, firmware or a combination of these. The processor controls operation of the system. Notably, the processor obtains the input image from the image source, and performs image processing steps for the input image to produce the images for the display apparatus. The processor is communicably coupled to the image source wirelessly and/or in a wired manner. By way of such coupling, the processor obtains the input image from the image source.

Optionally, the processor is configured to obtain the information indicative of the gaze direction of the user from the means for detecting the gaze direction. Optionally, in this regard, the processor is communicably coupled to said means.

Optionally, the processor is configured to utilize the information indicative of the gaze direction of the user to determine the region of interest of the input image. The term "region of interest" refers to a region of the input image whereat the gaze direction of the user is directed (namely, focused) when the user views the input image. In other words, the region of interest is a fixation region within the input image. When the gaze direction of the user is directed towards the region of interest, the region of interest is focused onto the fovea of the user's eyes, and is resolved to a much greater detail as compared to the remaining region(s) of the input image.

The processor is configured to process the input image to generate the first image and the second image. Throughout the present disclosure, the term "first image" refers to a low-resolution representation of the input image, whereas the term "second image" refers to a high-resolution representation of a portion of the input image. Notably, the first image corresponds to an entirety of the input image, whereas the second image corresponds to only the region of interest of the input image. The first image and the second image collectively constitute the visual scene that is to be displayed to the user of the display apparatus.

Optionally, the first image is generated by reducing a resolution of the input image, while the second image is generated by cropping the input image. In other words, the first image represents the entirety of the input image at a lower resolution than the input image, whereas the second image represents only a specific portion of the input image that is extracted upon cropping the input image. Notably, a resolution of the first image is lower than a resolution of the input image, whereas a resolution of the second image is same as a resolution of the input image.

It will be appreciated that the resolution of the second image is higher than the resolution of the first image. For a given pixel within the first image, there would always be a plurality of corresponding pixels of the second image.

Throughout the present disclosure, the "first region of the first image" refers to a region of the first image that corresponds to the region of interest of the input image, said first region of the first image being blurred with respect to the region of interest. The first region of the first image appears to have lesser visual detail as compared to the region of interest. The first region of the first image can be understood to be a low-pass region of the first image. A remaining region of the first image corresponds to a remaining region (namely, a region other than the region of interest) of the input image. Said remaining region of the first image constitutes, within the visual scene, a representation of the remaining region of the input image.

Optionally, when generating the first region of the first image, the processor is configured to apply a blur filter to pixels within the region of interest of the input image.

The second image corresponds to the region of interest of the input image. It will be appreciated that the second image corresponds to the same region of the input image as the first region of the first image. The first region of the first image and the second image collectively constitute a representation of the region of interest within the visual scene.

Hereinabove, the phrases "the first region of the first image corresponds to the region of interest of the input image" "the second image corresponds to the region of interest of the input image" are used to mean that the first region of the first image and the second image correspond to at least 80 percent of the region of interest of the input image; more optionally, to at least 90 percent of the region of interest of the input image; and yet more optionally, to at least 95 percent of the region of interest of the input image.

The processor adjusts, based on the intensity of pixels within the region of interest, the intensity of corresponding pixels within the first region of the first image and the intensity of corresponding pixels within the second image. Such an adjustment is made in a manner that the collective intensities of the corresponding pixels within the first region of the first image and the second image closely emulate an original intensity of the pixels within the region of interest. Optionally, the processor performs said adjustment by way of at least one image processing operation.

Hereinabove, the term "intensity" of a given pixel refers to an overall brightness of the given pixel. Notably, the term "overall brightness" of the given pixel has been used to mean any of the following:
  a brightness of the given pixel, said brightness being indicated by a single value lying within a minimum brightness value and a maximum brightness value associated with the given pixel, when the given pixel is a pixel of a grayscale image; or
  an additive brightness of the given pixel, such additive brightness being indicated by a sum of brightness values of different colour channels associated with the given pixel, when the given pixel is a pixel of a colour image.

In an example, when the input image is a grayscale image, a brightness (namely, an intensity) of a given pixel within the input image may be equal to 0.2. Notably, said brightness may lie within a minimum brightness value '0' and a maximum brightness value '1' (or '256', in case of 8-bit binary numbers) associated with the given pixel. The brightness of the given pixel may be expressed in form of a single number as '0.2', in 8-bit binary form as '00110011', or in any other suitable form.

In another example, when the input image is a Red-Green-Blue (RGB) colour image, an additive brightness (namely, an intensity) of a given pixel within the input image may be equal to 496. Notably, said additive brightness may be a sum of brightness values '64', '224' and '208' of a red colour channel, a blue colour channel and a green colour channel, respectively, that are associated with the given pixel. It will be appreciated that based on additive combination of the aforesaid brightness values of the RGB colour channels, a resultant colour of said given pixel is produced to be 'turquoise'. The additive brightness of the given pixel may be expressed in form of a single number as '496', in RGB intensity form as (64,224,208), in 24-bit binary form as '010000001110000011010000', in hexadecimal form as '40E0D0', or in any other suitable form.

Throughout the present disclosure, the term "predefined intensity threshold" refers to a specific level of intensity for a pixel. Notably, any pixel having an intensity that is lower than or equal to the predefined intensity threshold can be understood to be a 'dark pixel', whereas any pixel having an intensity that is higher than the predefined intensity threshold can be understood to be a 'bright pixel'.

When the given pixel within the region of interest is a dark pixel, the first and second images are generated in a manner that the corresponding pixel within the first region of the first image is darker than the corresponding pixel within the second image. As a result, when the first region of the first image and the second image are optically combined to collectively constitute the region of interest within the visual scene, the corresponding pixel within the first region of the first image would provide a relatively dark base for the given pixel, whereas the corresponding pixel within the second image would provide a relatively bright visual detail that is to be additively combined with said dark base.

In an embodiment, the predefined intensity threshold is manually specified by the user of the display apparatus. In another embodiment, the predefined intensity threshold is selected by or is pre-configured into the processor of the display apparatus.

It will be appreciated that such a manner of adjusting intensities of pixels within the first image and the second image is beneficial with regard to scotopic vision of humans. When low-intensity (namely, dark) first and second images are to be rendered by separate image renderers, said adjustment of intensities provides subtle blending and enhanced low-intensity visual detailing even when the separate image renderers have different ranges of colour reproduction (namely, intensity ranges). A low-intensity visual scene thus produced using said first and second images appears uniform and immersive to the user.

Moreover, the visual scene created upon optical combination of the first image and the second image has variable resolution, and therefore, emulates foveation characteristics of the human visual system. To the user, the visual scene appears to have a higher resolution in a region that corresponds to an optical combination of the first region of the first image and the second image, and to have a lower resolution in remaining region of the visual scene.

Optionally, the intensity of the pixels within the region of interest is higher than the intensity of the corresponding pixels within the first region of the first image. In other words, the intensity of the corresponding pixels within the first region of the first image is adjusted in a manner that the pixels within the first region of the first image appear darker as compared to their corresponding pixels within the region of interest.

Optionally, in this regard, when generating the first image, the processor is configured to apply a darkening effect to the pixels within the region of interest. Said darkening effect is applied in a manner that only the first region of the first image (that is to be optically combined with the second image) appears darkened. In such a case, an intensity of the remaining region of the first image may remain unchanged.

As an example, when a given pixel within a region of interest of a grayscale image has an intensity equal to 0.15, the first image may be generated in a manner that an intensity of a corresponding pixel within the first region of the first image is 0.1.

Optionally, the intensity of the pixels within the second image is adjusted based on the intensity of the corresponding pixels within the region of interest and the intensity of the corresponding pixels within the first region of the first image. Optionally, in this regard, when generating the first image and the second image, the processor is configured to calculate the intensity of the pixels within the second image in a manner that a sum of an intensity of a given pixel within the second image and an intensity of a corresponding pixel within the first region of the first image lies within a predefined threshold from an original intensity of a corresponding pixel within the region of interest, wherein a projection of the given pixel within the second image is to be optically combined with a projection of the corresponding pixel within the first region of the first image when the first and second images are rendered. Upon such optical combination, the intensity of the given pixel within the second image and the intensity of the corresponding pixel within the first region of the first image would be additively combined to achieve a resultant intensity. Such a resultant intensity lies within the predefined threshold from the original intensity of the corresponding pixel within the region of interest, thereby accurately mimicking the original intensity of the corresponding pixel.

Optionally, the predefined threshold is +/−10% of the original intensity of the corresponding pixel within the region of interest. In an example, when an original intensity of a given pixel within the region of interest is M, a sum of an intensity of its corresponding pixel within the second image and an intensity of its corresponding pixel within the first region of the first image would lie within a range of 0.9*M to 1.1*M. The sum of the intensities of the corresponding pixels within the second image and the first region of the first image may be, for example, equal to 0.9*M, 0.95*M, M, 1.05*M or 1.1*M.

It will be appreciated that such a manner of adjusting allows for harmoniously matching the intensity of pixels within the second image and the first region of the first image when the region of interest of the input image comprises dark pixels. Such first and second images, upon optical combination, provide a subtle blending effect and considerable low-intensity visual detailing for the region of interest of the input image. This allows for the display apparatus to provide enhanced perceived uniformity within low-intensity visual fixation regions of the visual scene. As a result, the user's experience whilst viewing the visual scene under scotopic vision conditions is considerably improved.

Optionally, the predefined intensity threshold is defined as 1 percent of a maximum intensity of at least one image renderer of the display apparatus. Optionally, in this regard, when the at least image renderer comprises a plurality of image renderers, the predefined intensity threshold is defined as 1 percent of a maximum intensity of an image renderer having lowest maximum intensity among the plurality of image renderers.

More optionally, the predefined intensity threshold is defined as 0.5 percent of the maximum intensity of the at least one image renderer of the display apparatus.

Optionally, for a given image renderer, a linear scale of intensity ranges from a minimum intensity to a maximum intensity, in an increasing order of intensity. Optionally, in this regard, the predefined intensity threshold is defined to be set at an intensity that is equal to 1 percent of the maximum intensity. More optionally, the predefined intensity threshold is defined to be set at an intensity that is equal to 0.5 percent of the maximum intensity.

As an example, when the linear scale of intensity for the given image renderer ranges from a minimum intensity of '0' to a maximum intensity of '1', the predefined intensity threshold is defined to be set at an intensity equal to ' 0.1'.

As another example, when the linear scale of intensity for the given image renderer that renders RGB colour images ranges from a minimum intensity of (0,0,0) to a maximum intensity of (255,255,255), the predefined intensity threshold is defined to be set at an intensity equal to 7.68 (or approximately, at an intensity equal to 8). According to such a linear scale of intensity, the intensity at (0,0,0) intensity is equal to 0; the intensity at (0,0,1), (0,1,0), (1,0,0), (0.5,0,0.5) and similar intensities is equal to 1; the intensity at (1,1,0), (1,0,1), (0,1,1), (2,0,0), (0,2,0), (0,0,2), (1.5,0.5,0), (0.5,1, 0.5) and similar intensities is equal to 2; and so on.

Optionally, when an intensity of a given pixel within the second image is lower than or equal to a predefined cut-off threshold, the intensity of the given pixel is adjusted to be equal to a minimum intensity of at least one image renderer that is to be employed for rendering the second image. More optionally, the predefined cut-off threshold is defined as 0.001 percent of a maximum intensity of the at least one image renderer that is to be employed for rendering the second image.

As an example, given an image renderer for rendering the second image, said image renderer having a minimum intensity equal to '0' and a maximum intensity equal to '1', the predefined cut-off threshold is set at 0.001. Therefore, when the intensity of the given pixel within the second image is equal to 0.0005, said intensity may be adjusted to be equal to '0'.

Optionally, when generating the first image and the second image, the processor is configured to bin pixels of the input image. Notably, binning pixels of the input image refers to combining intensities of pixels within the input image, in groups of four (namely, quad-groups). In such a case, intensities of a given group of four pixels within the input image are combined to generate a single resultant intensity corresponding to the given group.

Optionally, when binning pixels of the input image, intensities of four adjacent pixels of the input image is combined. As an example, an input image X may comprise 16 pixels arranged as a 4*4 grid. In such an example, intensities of a top-left group of four pixels P1-P4 of the grid may be combined to generate a resultant intensity I1, intensities of a top-right group of four pixels P5-P8 of the grid may be combined to generate a resultant intensity I2, intensities of a bottom-left group of four pixels P9-P12 of the grid may be combined to generate a resultant intensity I3, and intensities of a bottom-right group of four pixels P13-P16 may be combined to generate a resultant intensity I4.

Optionally, when the image source comprises the at least one camera, the processor is configured to bin the pixels of the input image by combining intensities of pixels corresponding to quad groups of a colour filter mosaic of an imaging sensor of the at least one camera. The binning operation allows for increasing a frame rate, and improving dynamic range, colour reproduction and exposure of the at least one camera.

It will be appreciated that binning pixels of the input image improves a signal to noise ratio within the generated first and second images. When such first and second images are rendered and optically combined, the visual scene provides superior quality visual detail even in darker regions of the visual scene.

Optionally, when the intensity of the given pixel within the region of interest is higher than the predefined intensity threshold, the intensity of the corresponding pixel within the first region of the first image is higher than the intensity of the corresponding pixel within the second image. It will be appreciated that adjusting the intensity of the corresponding pixel within the second image to be relatively low allows for prolonging a lifetime of the at least one image renderer that is to be employed for rendering the second image. As an example, when a given image renderer for rendering the second image is implemented as an OLED-based display, pixels of the given image renderer generally wear out as a function of a required intensity of said display and time. In such an example, adjusting intensities of corresponding pixels of the first and second images in the aforesaid manner may facilitate in prolonging the lifetime of the given image renderer.

Optionally, the display apparatus comprises at least a first image renderer and a second image renderer, wherein the first image and the second image are to be rendered, respectively, at the first image renderer and the second image renderer substantially simultaneously, further wherein a projection of the rendered first image is to be optically combined with a projection of the rendered second image in a manner that the projection of the rendered second image substantially overlaps with a projection of the first region of the rendered first image. The projection of the rendered first image is optically combined with the projection of the rendered second image to form a combined projection. When the combined projection is incident upon the user's eyes, the user views a single image of the visual scene, instead of two separate first and second images. It will be appreciated that rendering the first image and the second image substantially simultaneously allows for rendering the visual scene as a unified whole at a given time.

By "substantially simultaneously", it is meant that a time instant of rendering the first image and a time instant of rendering the second image lie within 200 milliseconds of each other, and more optionally, within 20 milliseconds of each other.

Throughout the present disclosure, the term "projection" of a given image refers to a collection of light rays emanating from a given image renderer, when the given image is rendered by the given image renderer. The projection of the given image (namely, the collection of light rays) may transmit through and/or reflect from various components of the display apparatus, before reaching the user's eye. For purposes of embodiments of the present disclosure, the term "projection of the given image" has been used consistently, irrespective of whether the collection of light rays is transmitted or reflected.

Hereinabove, by "substantially overlaps", it is meant that a misalignment between corresponding pixels of the second image and pixels of the first region of the first image lies within a range of 0 to 10 pixels, and more optionally, within a range of 0 to 5 pixels.

Throughout the present disclosure, the term "image renderer" refers to equipment that, when operated, renders images of the visual scene.

Optionally, the first image renderer and/or the second image renderer is/are implemented as at least one display. Optionally, the at least one display is selected from the group consisting of: a Liquid Crystal Display (LCD), a Light Emitting Diode (LED)-based display, a micro LED-based display, an Organic LED (OLED)-based display, a micro OLED-based display, a Liquid Crystal on Silicon (LCoS)-based display, a pinhole aperture array-based display, and a Cathode Ray Tube (CRT)-based display.

Optionally, the first image renderer and/or the second image renderer is/are implemented as at least one projector. Optionally, in this regard, the images are projected onto a projection screen or directly onto a retina of the user's eyes. Optionally, the at least one projector is selected from the group consisting of: an LCD-based projector, an LED-based projector, an OLED-based projector, an LCoS-based projector, a Digital Light Processing (DLP)-based projector, and a laser projector.

Optionally, the processor is configured to generate the first and second images in a manner that a first transition area within the first region of the first image fades on going from an outer periphery of the first transition area towards an inner periphery of the first transition area, while a second transition area within the second image fades on going from an inner periphery of the second transition area towards an outer periphery of the second transition area, wherein a projection of the first transition area is to substantially overlap with a projection of the second transition area when the first and second images are rendered. Optionally, the first transition area lies along a boundary of the first region of the first image. Optionally, the second transition area lies along a boundary of the second image.

Optionally, a width of the first transition area corresponds to 1% to 10% of a width of the first image. More optionally, the width of the first transition area corresponds to 5% to 10% of the width of the first image.

Similarly, optionally, a width of the second transition area corresponds to 1% to 10% of a width of the second image. More optionally, the width of the second transition area corresponds to 5% to 10% of the width of the second image.

Optionally, the width of the first transition area is equal to the width of the second transition area. Alternatively, optionally, the width of the first transition area and the width of the second transition area are unequal.

In an example, the first image has a width equal to 50 millimetres, whereas second image has a width equal to 20 millimetres. In such an example, the width of the first transition area may be 1 millimetre (corresponding to 2% of the width of the first image), whereas the width of the second transition area may be 1 millimetre (corresponding to 5% of the width of the second image).

It will be appreciated that said manner of fading the first transition area and the second transition area allows for reducing screen door effect upon overlapping of the projections of the first transition area and the second transition area. Moreover, the aforesaid manner of fading allows for smooth and gradual blending of said projections of the first and second transition areas. Image processing techniques for fading the first transition area and the second transition area are well-known in the art.

Optionally, the display apparatus further comprises at least one optical element for optically combining the projection of the rendered first image with the projection of the rendered second image, wherein a processor of the display apparatus is configured to determine, based upon the detected gaze direction of the user, a region of the at least one optical element onto which the projection of the first region of the rendered first image and the projection of the rendered second image are to be focused, and to make an adjustment to focus the projection of the first region of the rendered first image and the projection of the rendered second image on said region of the at least one optical element. Optionally, in this regard, the display apparatus further comprises an image steering unit, wherein the image steering unit is configured to make the adjustment to focus the projection of the first region of the rendered first image and the projection of the rendered second image on said region of the at least one optical element.

Optionally, the at least one image steering unit comprises at least one actuator for moving at least one of: the at least one first image renderer, the at least one second image renderer, the at least one optical element.

Optionally, the at least one optical element is implemented by way of at least one of: a lens, a mirror, a semi-transparent mirror, a semi-transparent film, a semi-transparent flexible membrane, a prism, a beam splitter, an optical waveguide, a polarizer.

It will be appreciated that the at least one optical combiner allows for optically combining the projection of the rendered first image with the projection of the rendered second image in a manner that the projection of the rendered second image and the projection of the first region of the first image are incident upon a fovea of the user's eyes, whereas a projection of a remaining region of the rendered first image is incident upon a remaining region of the retina of the user's eyes.

The present disclosure also relates to the method as described above. Various embodiments and variants disclosed above apply mutatis mutandis to the method.

Optionally, in the method, the intensity of the pixels within the region of interest is higher than the intensity of the corresponding pixels within the first region of the first image.

Optionally, in the method, the intensity of the pixels within the second image is adjusted based on the intensity of the corresponding pixels within the region of interest and the intensity of the corresponding pixels within the first region of the first image.

Optionally, in the method, when the intensity of the given pixel within the region of interest is higher than the predefined intensity threshold, the intensity of the corresponding pixel within the first region of the first image is higher than the intensity of the corresponding pixel within the second image.

Optionally, in the method, the predefined intensity threshold is defined as 1 percent of a maximum intensity of at least one image renderer of the display apparatus.

Optionally, in the method, the step of processing the input image comprises binning pixels of the input image.

Optionally, the method further comprises producing the input image based on the gaze direction of the user.

Optionally, the method further comprises:
  obtaining information indicative of a head orientation of the user; and
  producing the input image based on the head orientation of the user.

The present disclosure also relates to the computer program product as described above. Various embodiments and variants disclosed above apply mutatis mutandis to the computer program product.

DETAILED DESCRIPTION OF THE DRAWINGS

Figure 1:
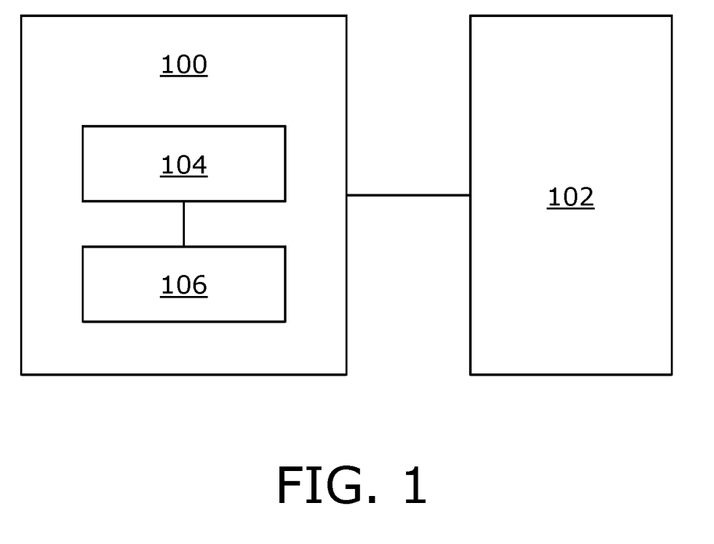
FIGS. 1 and 2 are block diagrams of different architectures of a system for producing images for a display apparatus, in accordance with different embodiments of the present disclosure.

Referring to FIG. 1, illustrated is a block diagram of an architecture of a system 100 for producing images for a display apparatus 102, in accordance with an embodiment of the present disclosure. The system 100 comprises an image source 104 and a processor 106 communicably coupled to the image source 104. The system 100 is at least communicably coupled to the display apparatus 102.

The image source 104 is employed to obtain an input image. The processor 106 is configured to obtain information indicative of a gaze direction of a user, determine a region of interest of the input image based on the gaze direction of the user, and process the input image to generate a first image and a second image. The first image comprises a first region that is blurred with respect to the region of interest of the input image. The second image corresponds to the region of interest of the input image. When generating the first image and the second image, the processor 106 is configured to adjust, based on an intensity of pixels within the region of interest, an intensity of corresponding pixels within the first region of the first image and an intensity of corresponding pixels within the second image. When an intensity of a given pixel within the region of interest is lower than or equal to a predefined intensity threshold, an intensity of a corresponding pixel within the first region of the first image is lower than an intensity of a corresponding pixel within the second image.

It may be understood by a person skilled in the art that the FIG. 1 includes a simplified architecture of the system 100 for sake of clarity, which should not unduly limit the scope of the claims herein. The person skilled in the art will recognize many variations, alternatives, and modifications of embodiments of the present disclosure.

Figure 2:
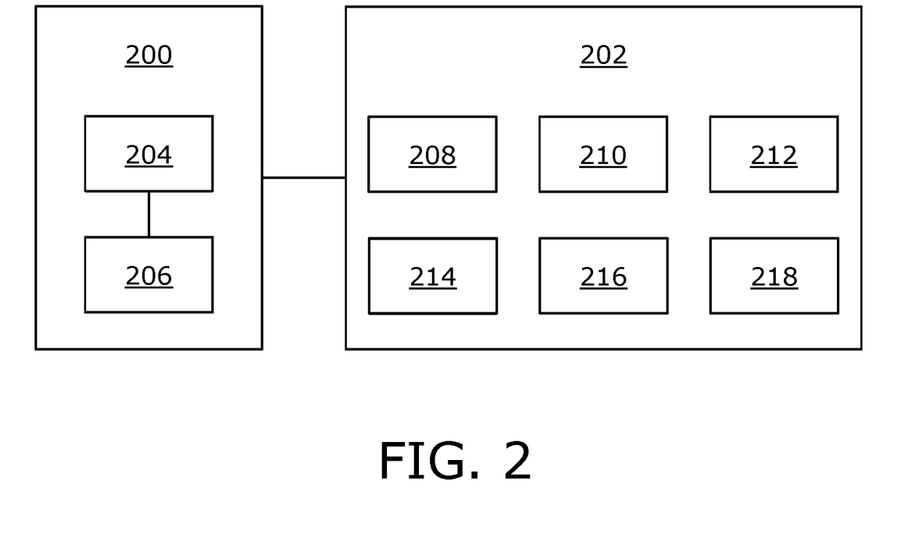

Referring to FIG. 2, illustrated is a block diagram of an architecture of a system 200 for producing images for a display apparatus 202, in accordance with another embodiment of the present disclosure. The system 200 comprises an image source 204 and a processor 206 communicably coupled to the image source 204. The system 200 is at least communicably coupled to the display apparatus 202. The image source 204 is employed to obtain an input image. The processor 206 is configured to obtain information indicative of a gaze direction of a user, determine a region of interest of the input image based on the gaze direction of the user, and process the input image to generate a first image and a second image.

The display apparatus 202 comprises at least a first image renderer (depicted as a first image renderer 208) and a second image renderer (depicted as a second image renderer 210), wherein the first image and the second image are to be rendered, respectively, at the first image renderer 208 and the second image renderer 210 substantially simultaneously, further wherein a projection of the rendered first image is to be optically combined with a projection of the rendered second image in a manner that the projection of the rendered second image substantially overlaps with a projection of the first region of the rendered first image.

The display apparatus 202 further comprises a means 212 for detecting a gaze direction of a user, said means 212 being configured to produce the information indicative of the gaze direction of the user. Moreover, the display apparatus 202 further comprises at least one optical element (depicted as an optical element 214) for optically combining the projection of the rendered first image with the projection of the rendered second image, wherein a processor (not shown) of the display apparatus 202 is configured to determine, based upon the detected gaze direction of the user, a region of the optical element 214 onto which the projection of the first region of the rendered first image and the projection of the rendered second image are to be focused, and to make an adjustment to focus the projection of the first region of the rendered first image and the projection of the rendered second image on said region of the element 214. In this regard, the display apparatus 202 further comprises an image steering unit 216, wherein the image steering unit 216 is configured to make the adjustment to focus the projection of the first region of the rendered first image and the projection of the rendered second image on said region of the optical element 214.

The display apparatus 202 further comprises means 218 for tracking a head orientation of a user, said means 218 being configured to produce information indicative of a head orientation of the user. In this regard, the processor 206 is configured to obtain the information indicative of the head orientation of the user, and to control the image source 204 to produce the input image based on the head orientation of the user.

It may be understood by a person skilled in the art that the FIG. 2 includes a simplified architecture of the system 200 for sake of clarity, which should not unduly limit the scope of the claims herein. The person skilled in the art will recognize many variations, alternatives, and modifications of embodiments of the present disclosure.

Figure 3:
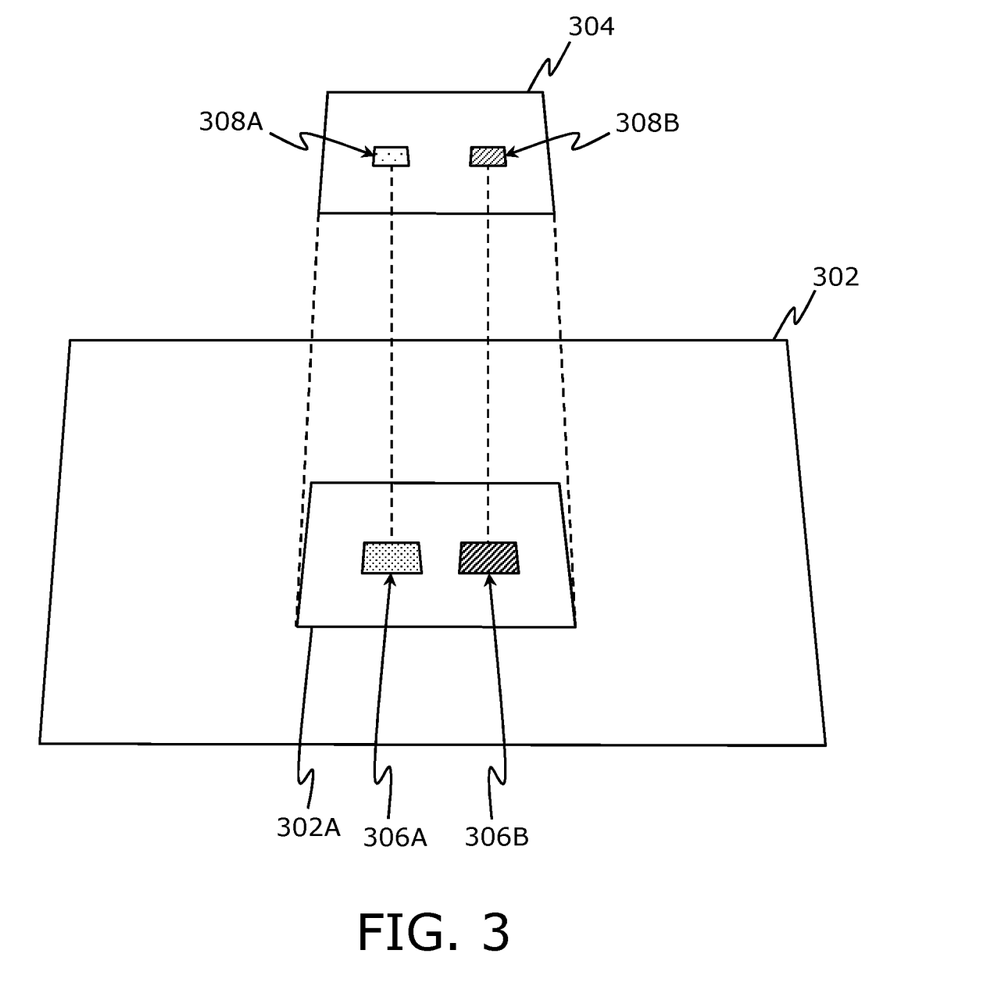
FIG. 3 is an exemplary schematic illustration of how an intensity of pixels within a first region of a first image and an intensity of pixels within a second image is adjusted, in accordance with an embodiment of the present disclosure.

Referring to FIG. 3, illustrated is an exemplary schematic illustration of how an intensity of pixels within a first region 302A of a first image 302 and an intensity of pixels within a second image 304 is adjusted, in accordance with an embodiment of the present disclosure.

The first image 302 and the second image 304 are generated upon processing an input image (not shown). The first region 302A of the first image 302 is blurred with respect to a region of interest of the input image. The first image 302 corresponds to an entirety of the input image. The second image 304 corresponds to the region of interest of the input image. An intensity of pixels within the first region 302A of the first image 302 and an intensity of corresponding pixels within the second image 304 is adjusted, based on an intensity of corresponding pixels within the region of interest.

When an intensity of a given pixel within the region of interest is lower than or equal to a predefined intensity threshold, an intensity of a corresponding pixel 306A within the first region 302A of the first image 302 is lower than an intensity of a corresponding pixel 308A within the second image 304. In such a case, the pixel 306A is darker with respect to the pixel 308A.

Alternatively, when the intensity of the given pixel within the region of interest is higher than the predefined intensity threshold, an intensity of a corresponding pixel 306B within the first region 302A of the first image 302 is higher than an intensity of a corresponding pixel 308B within the second image 304. In such a case, the pixel 306B is brighter with respect to the pixel 308B.

It may be understood by a person skilled in the art that the FIG. 3 depicts simplified illustrations of the first image 302 and the second image 304 for sake of clarity only, which should not unduly limit the scope of the claims herein. The person skilled in the art will recognize many variations, alternatives, and modifications of embodiments of the present disclosure.

Figure 4:
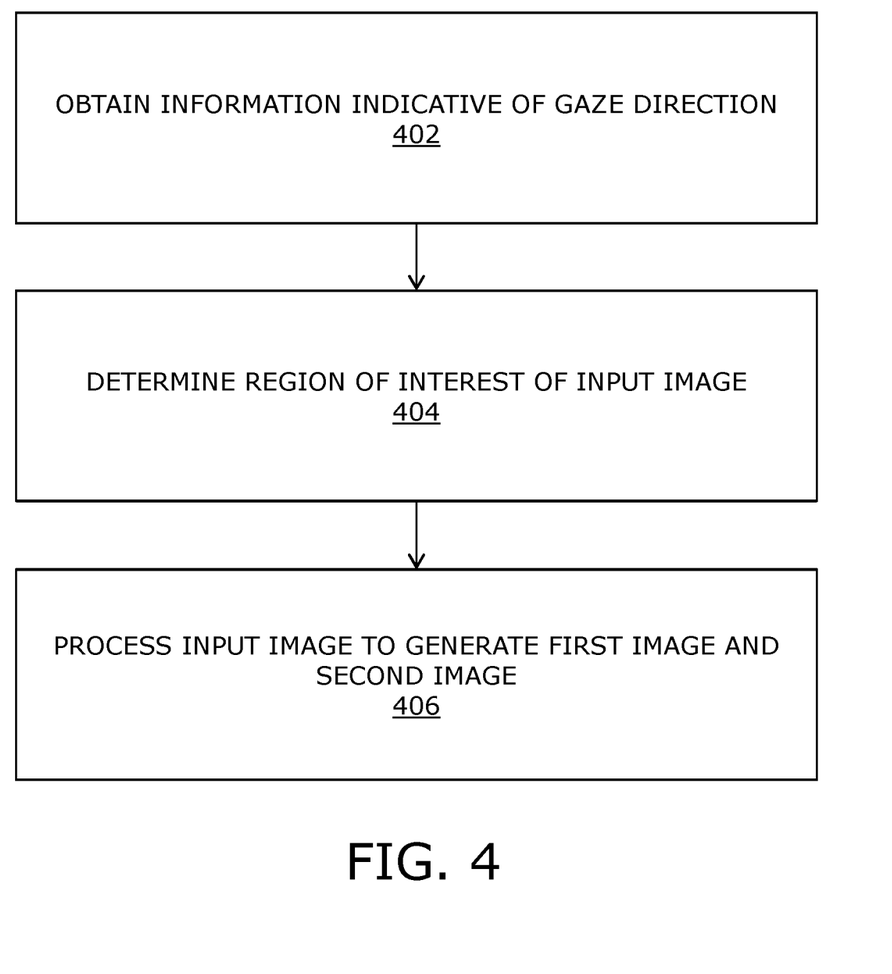
FIG. 4 illustrates steps of a method of producing images for a display apparatus, in accordance with an embodiment of the present disclosure.

Referring to FIG. 4, illustrated are steps of a method of producing images for a display apparatus, in accordance with an embodiment of the present disclosure. At a step 402, information indicative of a gaze direction of a user is obtained. At a step 404, a region of interest of an input image is determined based on the gaze direction of the user. At a step 406, the input image is processed to generate a first image and a second image. The first image comprises a first region that is blurred with respect to the region of interest of the input image, whereas the second image corresponds to the region of interest of the input image.

The step 406 of processing the input image comprises adjusting, based on an intensity of pixels within the region of interest, an intensity of corresponding pixels within the first region of the first image and an intensity of corresponding pixels within the second image, wherein when an intensity of a given pixel within the region of interest is lower than or equal to a predefined intensity threshold, an intensity of a corresponding pixel within the first region of the first image is lower than an intensity of a corresponding pixel within the second image.

The steps 402 to 406 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A system for producing images for a display apparatus, comprising:
   an image source that is employed to obtain an input image; and
   a processor communicably coupled to the image source, the processor being configured to:
      obtain information indicative of a gaze direction of a user;
      determine a region of interest of the input image based on the gaze direction of the user; and
      process the input image to generate a first image and a second image, the first image comprising a first region that is blurred with respect to the region of interest of the input image, wherein the second image corresponds to the region of interest of the input image,
   wherein, when generating the first image and the second image, the processor is configured to adjust, based on an intensity of pixels within the region of interest, an intensity of corresponding pixels within the first region of the first image and an intensity of corresponding pixels within the second image,
   wherein when an intensity of a given pixel within the region of interest is lower than or equal to a predefined intensity threshold, an intensity of a corresponding pixel within the first region of the first image is lower than an intensity of a corresponding pixel within the second image, and wherein when the intensity of the given pixel within the region of interest is higher than the predefined intensity threshold, the intensity of the corresponding pixel within the first region of the first image is higher than the intensity of the corresponding pixel within the second image.

2. The system of claim 1, wherein the intensity of the pixels within the region of interest is higher than the intensity of the corresponding pixels within the first region of the first image.

3. The system of claim 1, wherein the intensity of the pixels within the second image is adjusted based on the intensity of the corresponding pixels within the region of interest and the intensity of the corresponding pixels within the first region of the first image.

4. The system of claim 1, wherein the predefined intensity threshold is defined as 1 percent of a maximum intensity of at least one image renderer of the display apparatus.

5. The system of claim 1, wherein, when generating the first image and the second image, the processor is configured to bin pixels of the input image.

6. The system of claim 1, wherein the display apparatus comprises at least a first image renderer and a second image renderer, wherein the first image and the second image are to be rendered, respectively, at the first image renderer and the second image renderer simultaneously, further wherein a projection of the rendered first image is to be optically combined with a projection of the rendered second image in a manner that the projection of the rendered second image overlaps with a projection of the first region of the rendered first image.

7. The system of claim 1, wherein the processor is configured to control the image source to produce the input image based on the gaze direction of the user.

8. The system of claim 1, wherein the processor is configured to:
obtain information indicative of a head orientation of the user; and
control the image source to produce the input image based on the head orientation of the user.

9. A method of producing images for a display apparatus, comprising:
obtaining information indicative of a gaze direction of a user;
determining a region of interest of an input image based on the gaze direction of the user; and
processing the input image to generate a first image and a second image, the first image comprising a first region that is blurred with respect to the region of interest of the input image, wherein the second image corresponds to the region of interest of the input image,
wherein the step of processing the input image comprises adjusting, based on an intensity of pixels within the region of interest, an intensity of corresponding pixels within the first region of the first image and an intensity of corresponding pixels within the second image,
wherein when an intensity of a given pixel within the region of interest is lower than or equal to a predefined intensity threshold, an intensity of a corresponding pixel within the first region of the first image is lower than an intensity of a corresponding pixel within the second image, and
wherein when the intensity of the given pixel within the region of interest is higher than the predefined intensity threshold, the intensity of the corresponding pixel within the first region of the first image is higher than the intensity of the corresponding pixel within the second image.

10. The method of claim 9, wherein the intensity of the pixels within the region of interest is higher than the intensity of the corresponding pixels within the first region of the first image.

11. The method of claim 9, wherein the intensity of the pixels within the second image is adjusted based on the intensity of the corresponding pixels within the region of interest and the intensity of the corresponding pixels within the first region of the first image.

12. The method of claim 9, wherein the predefined intensity threshold is defined as 1 percent of a maximum intensity of at least one image renderer of the display apparatus.

13. The method of claim 9, wherein the step of processing the input image comprises binning pixels of the input image.

14. The method of claim 9, further comprising producing the input image based on the gaze direction of the user.

15. The method of claim 9, further comprising:
obtaining information indicative of a head orientation of the user; and
producing the input image based on the head orientation of the user.

16. A computer program product comprising a non-transitory machine-readable data storage medium having stored thereon program instructions that, when accessed by a processing device, cause the processing device to:
obtain information indicative of a gaze direction of a user;
determine a region of interest of an input image based on the gaze direction of the user; and
process the input image to generate a first image and a second image, the first image comprising a first region that is blurred with respect to the region of interest of the input image, wherein the second image corresponds to the region of interest of the input image,
wherein the program instructions, when accessed by the processing device, cause the processing device to adjust, based on an intensity of pixels within the region of interest, an intensity of corresponding pixels within the first region of the first image and an intensity of corresponding pixels within the second image when processing the input image,
wherein when an intensity of a given pixel within the region of interest is lower than or equal to a predefined intensity threshold, an intensity of a corresponding pixel within the first region of the first image is lower than an intensity of a corresponding pixel within the second image, and
wherein when the intensity of the given pixel within the region of interest is higher than the predefined intensity threshold, the intensity of the corresponding pixel within the first region of the first image is higher than the intensity of the corresponding pixel within the second image.

* * * * *